July 4, 1967 — G. E. FISHER — 3,329,808
CARGO LOADING COMPUTER
Filed April 8, 1963 — 6 Sheets-Sheet 1

$M_H$ – BENDING MOMENT, HOGGING
$M_S$ – BENDING MOMENT, SAGGING
$F_H$ – SHEAR FORCE, HOGGING
$F_S$ – SHEAR FORCE, SAGGING

INVENTOR.
GERALD E. FISHER
BY
ATTORNEY

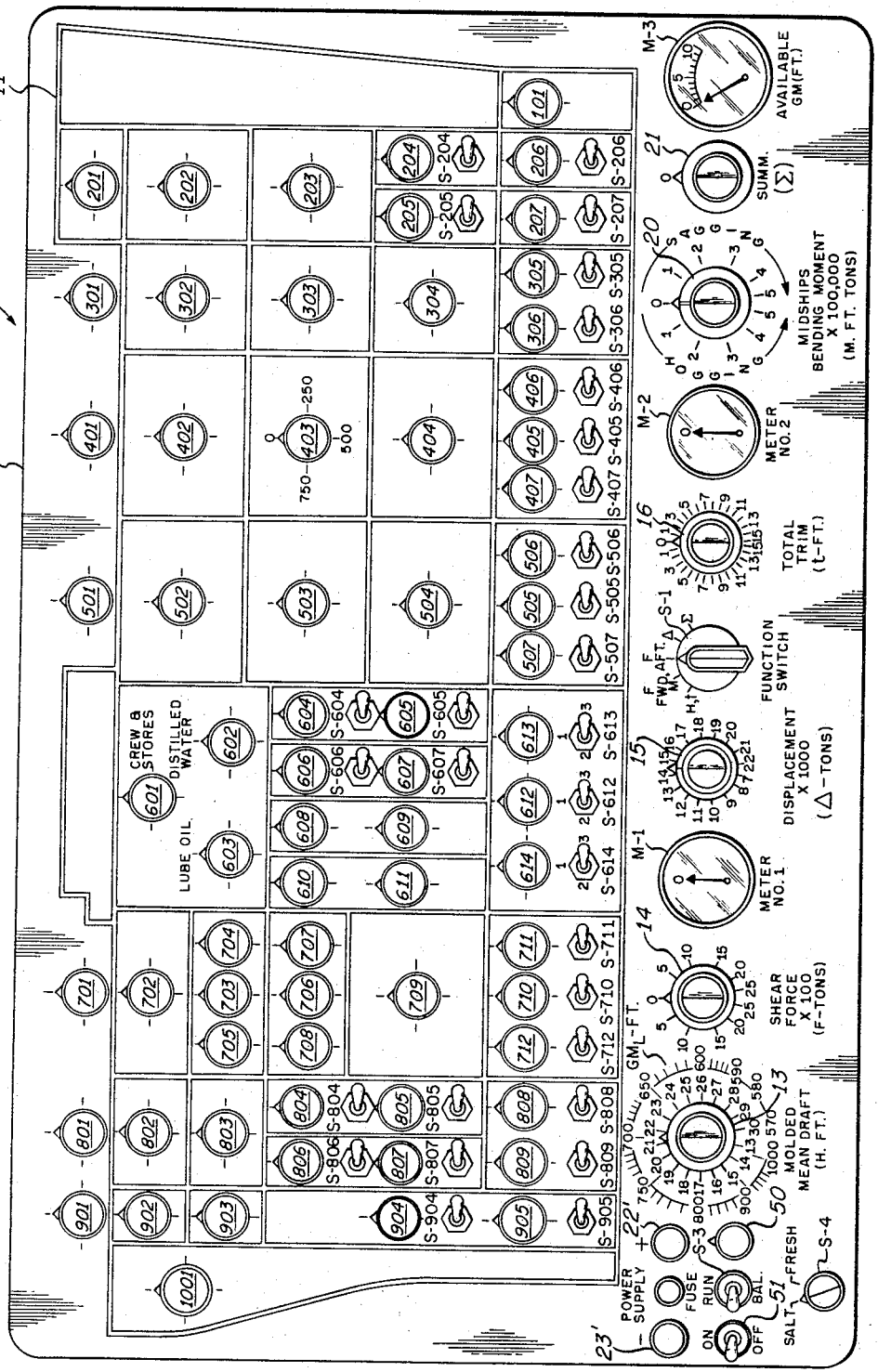

July 4, 1967 G. E. FISHER 3,329,808
CARGO LOADING COMPUTER
Filed April 8, 1963 6 Sheets-Sheet 3

INVENTOR.
GERALD E. FISHER
BY
ATTORNEY

July 4, 1967

G. E. FISHER 3,329,808

CARGO LOADING COMPUTER

Filed April 8, 1963

INVENTOR.
GERALD E. FISHER
BY
ATTORNEY

3,329,808
CARGO LOADING COMPUTER
Gerald E. Fisher, Charlottesville, Va., assignor to Sperry Rand Corporation, Great Neck, N.Y., a corporation of Delaware
Filed Apr. 8, 1963, Ser. No. 271,085
14 Claims. (Cl. 235—193)

The present invention relates to apparatus for determining the proper loading of cargo on a craft.

The criteria which are of importance in determining the optimum loading of a cargo on a vessel are computed electrically by means of the present invention in order that various load placements for a given voyage may be compared quickly and accurately. An operator may then decide on the basis of the information provided which of the proposed loading plans provides the best combination for the particular vessel and voyage involved.

Prior art devices provide certain information, for example, shear force, center of gravity, and bending moment. But generally speaking, they are cumbersome to operate thereby requiring considerably more time on the part of the operator and furthermore do not provide all of the information desirable for determining the optimum cargo loading.

The present invention on the other hand provides outputs representative of the transverse metacentric height GM, the longitudinal metacentric height $GM_L$, the molded means draft H, the total trim $t$, the midships bending moment M, the shear forces F at the forward and after quarter-lengths, and the total displacement $\Delta$. Further, the transverse metacentric height GM is corrected for free surface effects of the cargo in order to provide an output representative of the available transverse metacentric height $GM_a$.

It is therefore a primary object of the present invention to provide apparatus for determining the proper loading of cargo on a craft.

It is another object of the present invention to provide ship cargo loading apparatus which computes the necessary functions for determining the proper loading of cargo.

It is a further object of the present invention to provide apparatus for predicting the stability of a ship as a function of the proposed cargo distribution.

These and other objects will become apparent by referring to the specification in conjunction with the drawings in which FIG. 1 is a longitudinal sectional view of a typical cargo ship showing the principal elements thereof.

FIG. 4 is a front view of a cargo loading board for use with the ship of FIG. 1.

Figure 1:
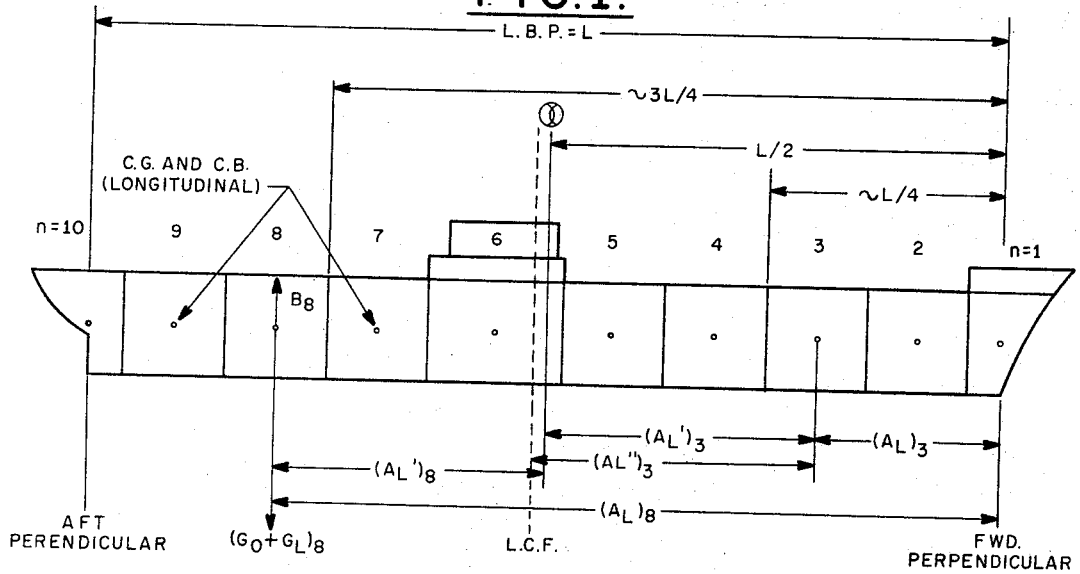
Figure 5A:
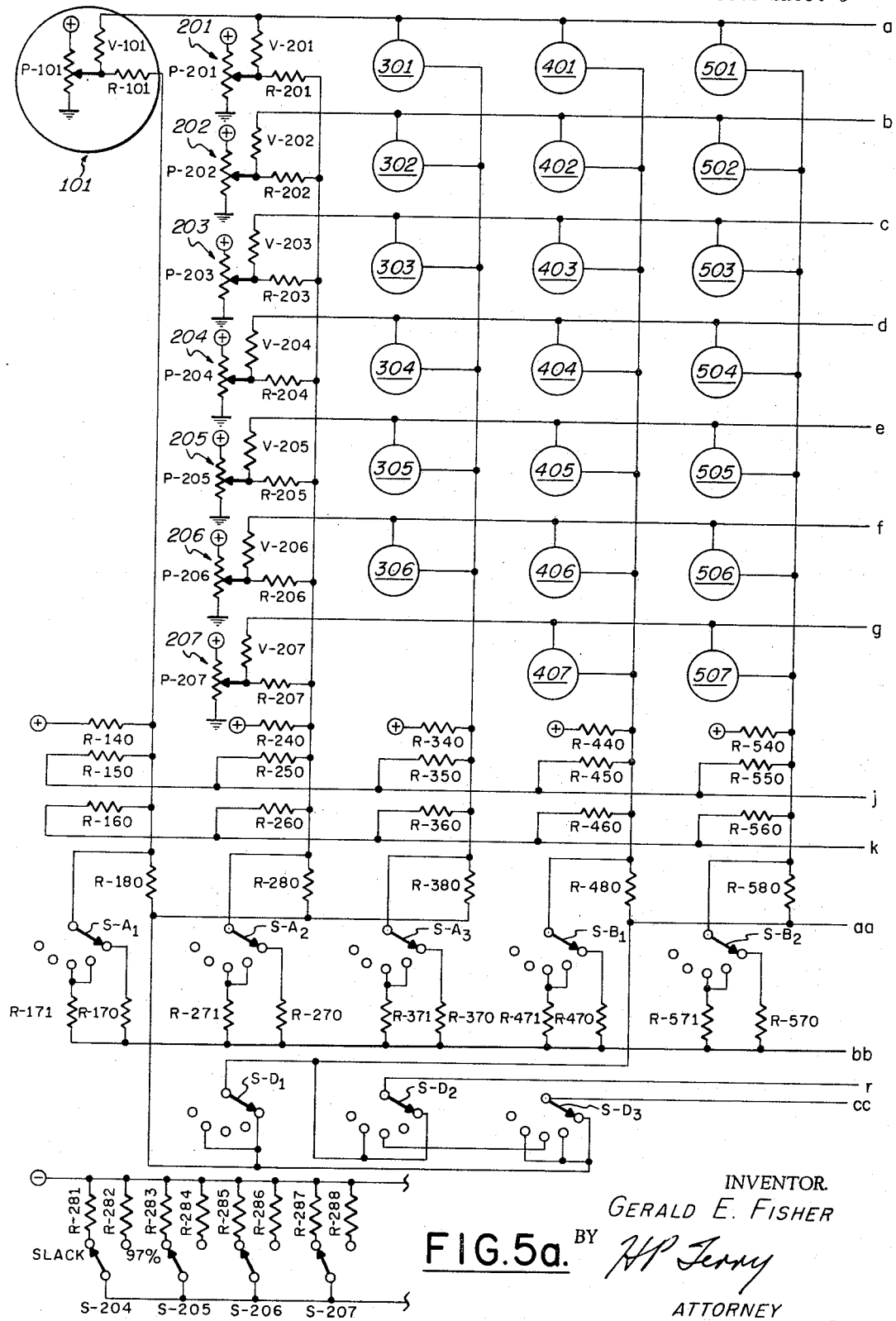

FIGS. 5a, b and c form a composite schematic wiring diagram of a cargo loading computer utilized with the cargo loading board of FIG. 4 that is adapted for the ship of FIG. 1.

Figure 6:
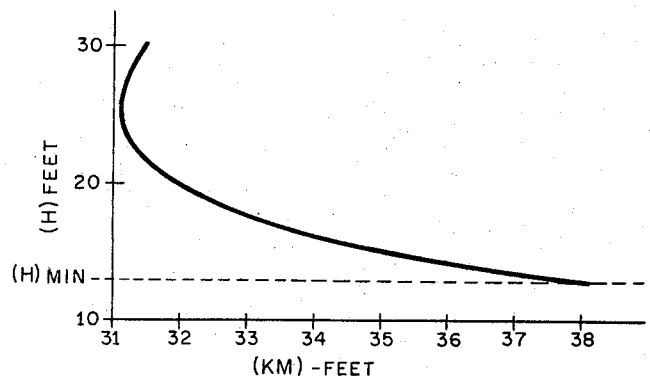

FIG. 6 is a graph of draft H versus the vertical distance of the metacenter above the keel KM for the ship of FIG. 1.

Figure 7:
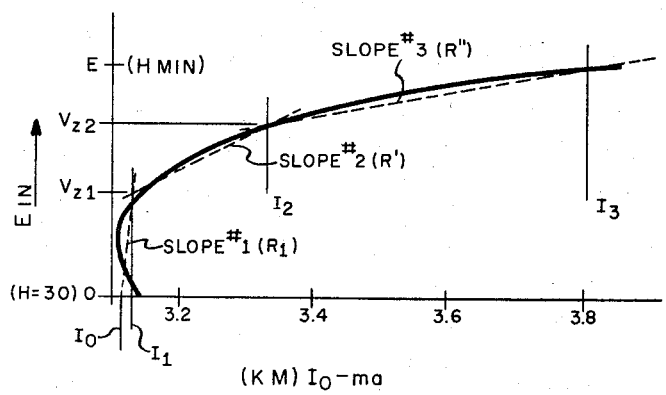

FIG. 7 is an inverted graph of FIG. 6, and

Figure 8:
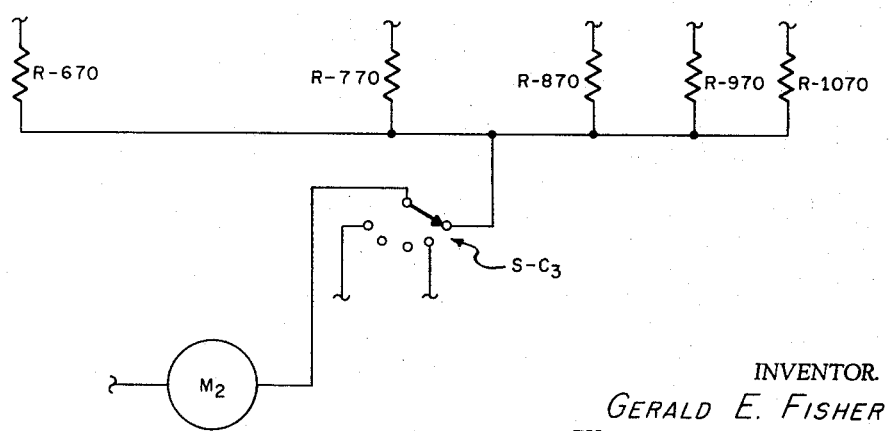

FIG. 8 is an alternative embodiment of a portion of the computer of FIGS. 5a, b and c.

Referring to FIG. 1, in accordance with the present invention the procedure for determining the molded mean draft H is by means of a force summation balance as defined by the $$\sum_{n=1}^{10}(G_L+G_o)n=\sum_{n=1}^{10}(B)_n \qquad (1)$$

i.e., the total ship weight is equal to the total ship buoyancy force where $n$ = section number
$G_L$ = load weight
$G_o$ = lightship weight, and
$B$ = buoyancy of the section (tons)

Similarly, the trim $t$ of the ship may be detremined by a moment summation balance as defined by the formula:

$$\sum_{n=1}^{10}[(G_L+G_o)A_L]_n=\sum_{n=1}^{10}[(B)(A_L)]_n \qquad (2)$$

i.e., the force due to the total ship weight multiplied by its effective moment arm is equal to the total ship buoyancy force multiplied by its effective moment arm where $A_L$ = average longitudinal moment arm from the forward perpendicular.

As will be more fully appreciated later, Equations 1 and 2 are interdependent and must be solved simultaneously in order to determine a unique solution.

Figure 2:
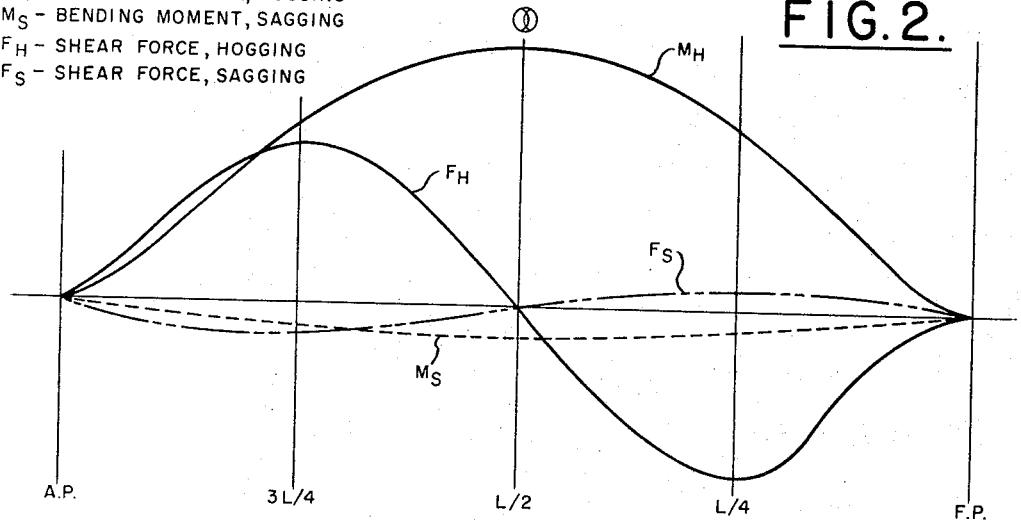
FIG. 2 is a graph showing the shear forces and bending moments typical of the ship of FIG. 1.

The shear force F at the quarter-lengths of the ship are taken at the bulkheads nearest the respective positions along the length of the vessel, since the shear force curves, as shown in FIG. 2, are maximum at or very near these positions. Therefore, $$F_{\text{Forward}}=\sum_{n=1}^{n \geq L/4}[(G_L+G_o)-B]_n \qquad (3)$$

and $$F_{\text{aft}}\sum_{n \geq 3L/4}^{n=10}[(G_L+G_o)-B]_n \qquad (4)$$

The bending moment M is taken at midships ( x ) since this is the position where the bending moment is at or very near a maximum as shown in FIG. 2. The midships bending moment M is the net downward (+) or upward (−) force of either half of the ship multiplied by the effective moment arm from the center line ( x ) of the same half of the ship:

$$M=\sum_{n=1}^{L/2}[(G_L+G_o)-B]A_L')_n \qquad (5)$$

where $A'_L$ = average longitudinal moment arm from midships.

The longitudinal metacentric height $GM_L$ is a function of the draft H of the ship and may be determined by means of a second dial around the draft H knob 13 as shown in FIG. 4 or from charts of $GM_L$ vs. H.

Figure 3:
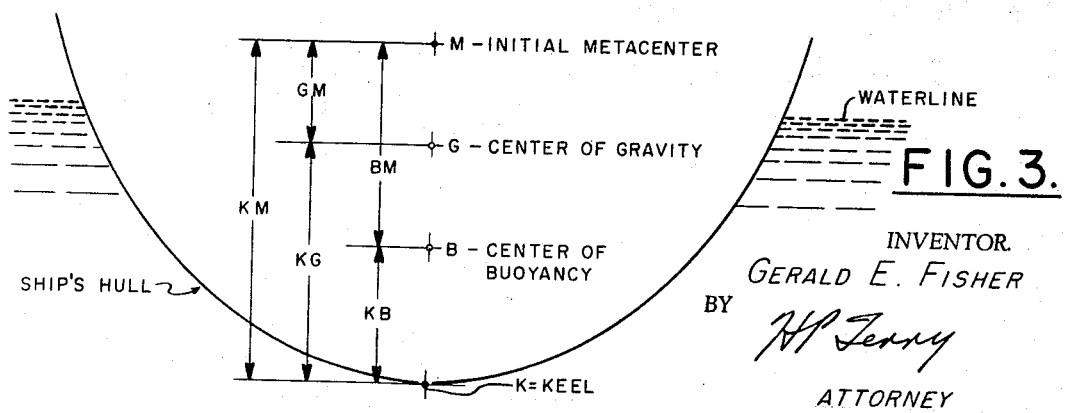
FIG. 3 is an anthwartship sectional view of the ship of FIG. 1.

Referring to FIG. 3, the transverse metacentric height GM is a more complex function and for purposes of the present invention may be broken down into its components, as follows:

$$GM=KB+BM-KG$$
$$=KM-KG \qquad (6)$$

where $KB$ = distance above the keel of the center of buoyancy,
$BM$ = distance above the center of buoyancy of the initial metacenter,
$KG$ = distance above the keel of the center of gravity, and
$KM$ = distance above the keel of the initial metacenter.

KM is a non-linear function of draft (in a manner to be explained) and a signal representative thereof is generated electrically as a function of draft. KG is not constant and is determined by summing the vertical moments of the ship and its various loads and dividing this quantity by the total ship and load weight:

$$KG = \frac{\sum_{n=1}^{10}[G_o(A_v)]_n(G_L A_v)_n^m}{\sum_{n=1}^{10}(G_o)_n + (G_L)_n^m} \quad (7)$$

where $m$=hold or tank number with respect to each section.

$A_v$=average vertical moment arm to the load in tank or hold from the keel.

In this manner the actual GM may be determined. However, the effects of various liquids which are free to move as the ship rolls (free surface effects) tend to decrease the actual GM to a figure which may be called the avilable GM, i.e., $GM_a$ $$GM_a = GM - (FS)_e \quad (8)$$

The available GM is of much more significance in determining the stability of the ship than is GM alone, and in some cases $GM_a$ may be less than half the GM value obtained by neglecting the free surface effects. For this reason it is very important to determine the magnitude of $(FS)_e$. This quantity may be defined as the effective change (increase) in KG due to the fact that there is a "moving" mass inside the ship.

$(FS)_e$ may be determined by summing all the moments of liquids in the various tanks, and dividing this sum by the total displacement of the ship.

$$(FS)_e = \frac{\sum (\text{Free Surface Moments})}{\sum_{n=1}^{10}(G_o)_n + (G_L)_n^m} \quad (9)$$

In accordance with the present invention in order to solve the above equations, each section of the ship is considered to be an entity, and all the load forces occurring in a given section are summed before any consideration is given to the ship as a whole. Thus, any given section has a lightship weight which is its fixed, own weight; variable load weights; and a buoyancy force determined by its immersion.

For purposes of example, the present invention will be described with respect to apparatus for determining the proper loading of cargo on a Mariner class cargo ship (C4–S–1a). It will be appreciated that the present invention is equally applicable to other classes of ships by making minor changes well within the knowledge of those skilled in the art.

In accordance with the present invention the Mariner ship is divided into several sections, in this instance 10, as shown in FIG. 1 each of which is treated as an entity. Each section includes one or more holds, tanks and compartments having a particular designation as indicated by the schedule below:

| Section, $n$ | Number of holds and tanks, $m$ | | Designation |
|---|---|---|---|
| 1 | 1 | $m=1$ | Forepeak. |
| 2 | 7 | $m=1,2...7$ | Hold #1. |
| 3 | 6 | $m=1,2...6$ | Hold #2. |
| 4 | 7 | $m=1,2...7$ | Hold #3. |
| 5 | 7 | $m=1,2...7$ | Hold #4. |
| 6 | 14 | $m=1,2...14$ | Midships Section. |
| 7 | 12 | $m=1,2...12$ | Hold #5. |
| 8 | 9 | $m=1,2...9$ | Hold #6. |
| 9 | 5 | $m=1,2...5$ | Hold #7. |
| 10 | 1 | $m=1$ | Afterpeak. |
|  | 69 | | |

Referring to FIG. 4, the apparatus of the present invention includes a cargo loading board 10 which has a cross section of the ship 11 engraved on the face plate 12 thereof. The cargo loading status board 10 includes a plurality of adjustable load knobs 101, 201 to 207, 301 to 306, 401 to 407, 501 to 507, 601 to 614, 701 to 712, 801 to 809, 901 to 905, 1001 as well as dials associated with each knob for each cargo, fuel and ballast compartment. The dial indications show the load in tons from 0 to 1,000 for each compartment. The physical locations of the load knobs on the ship cross section 11 correspond to the actual locations of the respective compartments on the Mariner cargo ship. As shown, the cargo loading status board 10 has segments or portions representing 10 sections with a total of 69 holds, tanks, or deck areas. Each of the load knobs is connected to the wiper arm of its respective input potentiometer (shown in FIG. 5) in order that the setting of the wiper arm produces a voltage proportional to the load weight of the cargo to be stored in the particular compartment. The load weight is manually set in by the human operator by rotating the particular load knob until the desired load is indicated on its dial. The potentiometers connected to the load knobs have the same reference numerals as their associated load knob, except that they are prefixed by a P. Further, each of the compartments that is used for storing fluid has a free surface switch that has the same designation as its associated load knob except that it is prefixed by an S. The function of the free surface switches will be described subsequently.

The status board 10 further includes several additional knobs, switches and meters including a draft H knob 13 having a first inner dial associated therewith which provides an indication of the molded mean draft H in feet, and a second outer dial indicating the longitudinal metacentric height $GM_L$, a shear force F knob 14 having a dial associated therewith for indicating the shear force in tons, a force meter M–1, a displacement $\Delta$ knob 15 having a dial indicating the displacement in tons, a function switch S having five dial positions H, $t$; $F_{fwd}$, M; $F_{aft}$; $\Delta$; and $\epsilon$. The board 10 also includes a trim $t$ knob 16 having a dial indicating the total trim in feet, a moment meter M–2, a bending moment M knob 20 having a dial indicating the hogging or sagging midships bending moment in foot tons, a vertical moment summation $\epsilon$ knob 21, and an available transverse metacentric height $GM_a$ meter M–3 which provides a needle deflection calibrated in feet from 0 to 10. The board 12 further includes positive and negative power supply indicators 22' and 23', respectively, a power supply switch S–3 and a relative water salinity switch S–4.

Referring now to FIGS. 5a, b, and c, which are reversed with respect to FIG. 4, each hold, compartment or tank is defined by a resistor group indicated as a circle bearing the same reference numeral as its associated load knob. Each resistor group, for example, the forepeak resistor group 101 of section 1, includes an input potentiometer, such as P–101, previously mentioned, having a wiper arm connected to its load knob, such as 101; a load weight resistor, such as R–101; and a load vertical moment resistor, such as V–101.

Each input potentiometer has one end of its resistive winding connected to a positive power source 22 and its other end connected to ground potential. Each of the input potentiometers is connected in series to its load weight resistor. The load weight resistors have the same reference numeral as their associated knob but they are prefixed by an R. A load vertical moment resistor is also connected in series with its input potentiometer and is designated with the same reference numeral as the associated knob but has a prefix V.

In each of the sections, for example section 1, the load weight resistors, such as R–101, are connected in parallel with a lightship weight resistor, such as R–140, which has its other end connected to the positive power source 22. The lightship weight resistors are numbered R–140, 240, 340, 440, 540, 640, 740, 840, 940 and 1040 and each provides a signal representative of the fixed or lightship weight of a particular section of the ship. A ship section buoyancy resistor such as R–150 is also connected in parallel with the load weight and lightship weight resistors of each particular section to provide a signal representative of the buoyancy of that particular section of the ship. The buoyancy resistors are numbered R–150, 250, 350, 450, 550, 650, 750, 850, 950, and 1050 and each is connected to a draft potentiometer P–13 through the function switch S, in a manner to be more fully explained.

A ship's section trim resistor, such as R–160 is also connected in parallel with the load weight, lightship weight and buoyancy resistors of that particular section to provide a signal which compensates the buoyancy signal in accordance with the trim of the ship, in a manner to be more fully described. The trim resistors are numbered R–160, 260, 360, 460, 560, 660, 760, 860, 960, and 1060. The fore trim resistors R–160, 260, 360, 460 and 560 are connected to a first trim potentiometer P–16' through one portion of the function switch S while the aft trim resistors R–660, 760, 860, 960, and 1060 are connected to a second trim potentiometer P–16'' through another portion of the function switch S in a manner to be more fully explained. The resistive winding of the trim potentiometer P–16' has one terminal connected to a negative power supply 23 and its other terminal connected to the positive power supply 22 while the corresponding terminals of the resistive windings of the trim potentiometer P–16'' are connected to positive and negative power supplies, respectively, to provide outputs therefrom having opposite polarities with respect to each other at any one particular setting of the trim knob 16.

As stated previously, each section of the ship is considered to be an entity and all of the load forces occurring in a given section are summed. For a given buoyancy input, each section, such as section 1, will have some net force; in most instances this force will not be zero but will have some additional weight or buoyancy. However, for the ship to be in equilibrium, the overall forces must be zero. Therefore, the buoyancy or draft H knob 13 is adjusted until the summation of forces throughout the ship is zero. When the draft H knob 13 is set to the correct position, it will be seen that the total current flow from all of the sections 1–10 will add up to zero since the downward weight due to the cargo load and the lightship weight will equal the upward buoyant force.

The above discussion has been simplified for purposes of example. Actually, the buoyancy force is a function of the draft and trim conditions. Thus, it is composed primarily of the buoyancy due to the ship's mean draft H but there is also the effect of trim $t$ which must be considered. The actual draft D in any given section is the mean draft H plus the change in draft due to trim $t$, e.g.

$$D = H + (A_L')_n \tan \phi \approx H + (A_L')_n \phi \qquad (10)$$

where $(A_L')_n$ may be plus or minus, i.e., a section forward or aft of the center line ($x$) and $\phi$ is the trim angle. For a ship trimmed by the stern, there will be an addition draft due to trim in the stern sections, i.e. $A_L'_n$ is positive, while in the bow sections there will be an actual section draft less than H so that $A_L'_n$ is negative. Taking the other case, a ship trimmed by the bow will have the signs of $A_L'_n$ reversed for the corresponding sections which explains the reason why the trim $t$ knob 16 adjusts two potentiometers P–16' and P–16'' which provide signals of opposite polarity to trim resistors on opposite sides of the center of the ship, which signal is reversible in polarity as the ship's trim reverses.

The draft potentiometer P–13 has one extremity of its resistive winding connected to the negative power source 23 and its other extremity connected through a series resistor 30 and shunting Zener diode 31 to ground. The resistor 30 and Zener diode 31 establish a minimum voltage on the draft potentiometer P–13 equivalent to 13 feet of draft which is the minimum unloaded draft of the Mariner type cargo vessel.

To provide a correction for salinity, depending upon whether the ship is operating in fresh or salt water, a resistor 32 is placed in series with the potentiometer P–13 when operating in fresh water by means of a switch S–4.

It will be appreciated that having two buoyancy inputs, i.e. draft H and trim $t$, leads to a plurality of combinations wherein the summation of forces may be zero and therefore no unique solution is possible. Thus, to yield a unique combination of mean draft and trim which will satisfy the necessary condition for equilibrium of the ship, the aforementioned moment balance equations must be considered.

Since a moment is a net force multiplied by some appropriate moment arm, it can be seen that if the output of a section's force circuit is multiplied by its corresponding moment arm, the resulting quantity will approximate that section's contribution to the ship's overall moment equation. As the longitudinal center of gravity of each section is assumed to remain fixed, the longitudinal moment arm to each section is a constant. Therefore, the moments throughout the ship are the forces in the ship multiplied by appropriate constants. Referring to section 1 of FIG. 5a, the current $(I_o)_1$ which is the summation of the currents from the parallel resistors of section 1 represents the net force generated by section 1. In order to obtain a value of $(E_o)_1$ corresponding to $(I_o)_1$ for section 1, a small series force summing resistor R–180 is inserted in the force circuit prior to the summation which results in $(I_o)_1$. After a voltage has been obtained in this matter, a multiplying ship's section longitudinal moment resistor R–170 may be used to generate a small current proportional to the moment of section 1 with the function switch S in its first position as shown. The moments from each of the circuits associated with the respective sections may then be summed in a manner similar to the forces.

The five position function switch S has a plurality of ganged contact arms designated with the suffixes $A_1$, $A_2$, $A_3$, $B_1$, $B_2$, $B_3$, $C_1$, $C_2$, $C_3$, $D_1$, $D_2$, $D_3$, $E_1$, $E_2$ and $F_1$, $F_2$, $F_3$ that cooperate with respective contacts. With the switch S in its first or H, $t$ position, the force summing resistors R–180, 280, 380, 480, 580, 680, 780, 880, 980, and 1080 are connected through switch S and switch S–3 to meter movement $M_1$ and thence to ground through the contact arm S–$E_2$. Similarly, with switch S in the same H, $t$ position, the longitudinal moment resistors R–170, 270, 370, 470, 570, 670, 770, 870, 970 and 1070 are connected through switch S to meter movement $M_2$, and thence through the contact arm S–$C_3$ to ground.

The forward shear force $F_{fwd}$ is the sum of the forces in those sections forward of the bulkhead nearest the quarterlength of the ship and the after shear force $F_{aft}$ is the sum of the forces in those sections aft of the bulkhead nearest the three-quarter length of the ship. Therefore, it is only necessary to insert switches into the overall force circuit which will disconnect the outputs in those sections whose outputs are not needed for determining the particular shear force in question. Since the meter movement $M_1$ is designed for much larger currents than will normally occur in obtaining the shear forces, a bridge balance circuit utilizing a variable resistance P–14 is employed to yield greater accuracy. The extremities of the resistive winding of the variable resistance P–14 are connected to the positive and negative power supplies 22 and 23, respectively. The wiper arm of the variable resistance P–14 is adjusted by positioning the force knob 14.

With the function switch S in its second or $F_{fwd}$, M position, the resistors R–180, 280 and 380 are connected through the contact arm S–$D_3$ to the meter movement $M_1$ which has its other side connected through the contact arm S–$E_2$ to the wiper arm of the variable resistance P–14. The addition of a small resistor 33 is necessary to develop a voltage against which to balance the potentiometer P–14. The value of the resistor 33 should not be appreciably larger than the internal resistance of the meter $M_1$ so as to leave the force circuits relatively undisturbed. By switching the function switch S to its third or $F_{aft}$ position, the resistors R–880, 980 and 1080 are connected through the contact arms S–D$_2$ and S–D$_3$ to the meter movement M$_1$ which has its other side connected through the contact arm S–E$_2$ to the force balance potentiometer P–14.

The midships bending moment is taken from midships and therefore a different set of moment resistors R–171, 271, 371, 471 and 571 is necessary (for those sections in the forward half of the ship only, for example). With the function switch S in its second or M position, these resistors are connected through the contact arm S–C$_1$ to one side of the meter M$_2$ which has its other side connected through the contact arm S–C$_3$ to the wiper arm of the bending moment variable resistance P–20. The potentiometer P–20 has the extremities of its resistive winding connected to positive and negative sources of supply 22 and 23, respectively, thereby forming a bridge network. A resistor 34 is connected to ground through the contact arm S–C$_2$ to develop a voltage in a manner similar to the force bridge network.

An important criterion for the determination of the stability of a vessel is the transverse metacentric height as explained above. Referring to FIGS. 3 and 5a, b and c, the vertical distance of the metacenter above the keel, KM, is a nonlinear function of the mean draft H, and in the present invention is generated electrically by means of a linear potentiometer P–13′ ganged to the draft potentiometer P–13 utilizing Zener diodes 40 and 41 as the nonlinear elements. The curve of H vs. KM which is to be reproduced may be as shown in FIG. 6.

It will be seen that the maximum KM occurs at the minimum H, and approximately vice versa. If the curve is inverted so that the input voltage (corresponding to (1/H)) increases along the vertical axis, the curve appears as shown in FIG. 7. The horizontal axis of FIG. 7 corresponds to KM; however, it is convenient to use the analgous current function (e.g., 1 foot=0.1 ma.) for example.

With the curve drawn in its inverted form with appropriate current scale factors, the least number of straight-line slopes are drawn which will yield sufficient accuracy; the first slope is assumed to be positive only. Once the slopes are drawn, the intersections of these slopes are found and the voltage and current points are determined at which successive slopes must be introduced as E$_{in}$ increases towards E. These voltages determine the breakdown voltages of the Zener diodes 40 and 41 which are used as switching elements. The slopes may be computed from the following equation referring to the circuit shown in FIG. 5c:

$$R_1 = \frac{V_{z1} - o}{I_1 - I_o}$$

$$R' = \frac{V_{z2} - V_{z1}}{I_2 - I_1}$$

$$R'' = \frac{E - V_{z2}}{I_3 - I_2}$$

where $$R_1 = R_1$$

$$R_2 = \frac{(R_1 R')}{(R_1 - R')}$$

$$R_3 = \frac{(R' R'')}{(R' - R'')}$$

$$R_4 = \frac{E}{I_o}$$

The resistor R$_4$ is added to provide a current proportional to the minimum value of KM, as the origin of the curve does not represent zero on the current axis.

Care must be taken to provide sufficient current to cause the Zener diodes to operate in their breakdown regions. In order to do this, it may be necessary to provide a larger current, in which case a current divider comprising resistors R$_5$ and R$_6$ should be included to drain off the unwanted current. The generation of KM as a function of H is now complete.

The computation of the vertical distance above the keel of the vertical center of gravity, KG is more complex. The vertical center of gravity for a given ship varies considerably with load conditions, and no general approximation of KG vs. H can be made. Therefore, as $$GM = KM - KG$$

defines the need for KG, it must be computed for each load condition. The general equation for KG appears as follows:

$$KG = \frac{\text{Sum of all vertical moments from the keel}}{\text{Sum of all weights}}$$

or, $$KG = \frac{(G_L)_1(A_v)_1 + (G_L)_2(A_v)_2 + (G_L)_3(A_v)_3 + \ldots + (G_o')(A_{vo})}{(G_L)_1 + (G_L)_2 + (G_L)_3 + \ldots + (G_o')}$$

where $(G_L)_1$ = load weight, hold or tank #1
$(A_v)_1$ = vertical moment arm, hold or tank #1
$(G_o')$ = actual weight of ship
$(A_{vo})$ = lightship vertical moment arm, and
$[(G_L)_1 + (G_L)_2 + (G_L)_3 + \cdots + (G_o')]$ = total displacement $\Delta$.

The load weights are generated electrically by the positioning of the input potentiometers, the wipers of which are connected to both the individual load weight resistors and the corresponding load vertical moment resistors. The total ship displacement may be found by removing the voltages corresponding to draft H and trim $t$, which is done by placing the function switch S in its fourth or $\Delta$ position thereby causing the contact arms S–F$_1$, S–F$_2$ and S–F$_3$ to disconnect the trim and draft potentiometers P–16′, P–16″ and P–13 from their respective trim and buoyancy resistors.

With the function switch S in its fourth or $\Delta$ position, the currents representing all the weights in the ship and the actual lightship weight are summed in the meter M$_1$ through the contact arms S–D$_1$, S–D$_2$, and S–D$_3$ and a bridge balance circuit including the variable resistance P–15 is used to determine the displacement $\Delta$. The resistive winding of the variable resistance P–15 has one end connected to the positive power supply 22 and its other end grounded.

The vertical moments of the loads in the ship are given by the currents from the vertical moment resistors. However, the lightship vertical moment current must yet be obtained. The lightship vertical center of gravity and displacement is given in a "Table of Principal Characteristics" of the ship. The displacement used here should be the value of $(\Delta_{min.})$ when the ship has been completely outfitted and is ready for sailing, less fuel oil, ballast, dry cargo, and crew stores. The lightship vertical moment is then the product of the $(\Delta_{min.})$ and the lightship vertical moment arm $(A_{vo})$, and a signal representative thereof is provided by a fixed resistor 42 having one end connected to the positive power supply 22. With the function switch S in its fifth or $\epsilon$ position, the currents representing all the vertical moments are connected through the contact arm S–C, to one side of the meter M$_2$ which has its other side connected through the contact arm S–C$_3$ to the variable resistance P–21.

The variable resistance P–21 has one end of its resistive winding connected to the positive power supply 22 and its other end grounded. The overall vertical movement of the ship is found by nulling the meter M$_2$ in the bridge balance circuit by means of the variable resistance P–21. A resistor 43 is connected to ground through the contact arm S–C₂ to develop a voltage as explained previously.

The remaining problem of dividing all the vertical moments $\epsilon$ by the total displacement $\Delta$ is accomplished by ganged variable resistances P–21′ and P–15′ connected to the knobs 21 and 15 respectively. The resistive winding of the variable resistance P–21′ has one end connected to the negative power source 23 and its other end grounded while the potentiometer P–15′ is connected in series with the potentiometer P–21′ through a resistor 44. The potentiometer P–21′ acts as a voltage amplifier and its wiper voltage which is representative of $\epsilon$ is isolated by the variable potentiometer P–15′ whose signal is proportional to $1/\Delta$ whence the division of $\epsilon/\Delta$ is provided. The currents of $$\frac{\epsilon}{\Delta} = KG$$

are negative to satisfy the equation $$GM = KM - KG$$

The potentiometer P–15′ is connected to the junction of the resistors $R_4$ and $R_6$ and to one side of the meter movement $M_3$ which has its other side grounded in order that the transverse metacentric height GM is displayed on the meter $M_3$ which has a range of 0 to 10 feet.

As noted previously, the transverse metacentric height GM is corrected by means of the present invention for the effects of liquid movements in the tanks, i.e., free surface effects, to provide a signal representative of the available metacentric height $GM_a$. Each tank in the ship is assumed to have four general states of fullness, as follows:

(1) Completely empty—no correction,
(2) 1–97% full—major correction,
(3) 97–99% full—minor correction,
(4) 100% full—no correction, because (1) A tank which is completely empty has no moving mass, ergo no correction.

(2) A tank which is partially full (Slack) has a certain mass which is free to move rather widely as the ship rolls, thus changing the position of the center of mass of the liquid from side to side.

(3) A tank which is nearly full has a relatively large mass, but its motion is constricted to small deviations due to the confines of the tank.

(4) A tank which is completely full (pressed up) has a large mass which is not free to move at all, therefore no correction.

As conditions (1) and (4) contribute no correction in the computation of $GM_a$, they are assumed to be identical in the following computations, and are designated as (0 or 100%) conditions.

Conditions (2) and (3) are merely different degrees of the same condition, and are designated as Slack and 97% respectively.

The moment contributed by a given tank is usually calculated by the ship designers and, for example, this information is contained in the Mariner "Trim and Stability Booklet" for both Slack and 97% conditions. The values given in information of this type are moments in foot-tons. To find the actual free surface effect correction $(FS)_e$ which is to be applied to GM to obtain $GM_a$, the sum of all the free surface moments in the ship is divided by the total displacement $\Delta$ of the ship, or $$(FS)_e = \frac{\epsilon \text{ (Free Surface Moments) ship}}{\Delta \text{ ship}}$$

The free surface moments are generated by electrical currents by means of free surface resistors, for example, R–281 or R–282 associated with a particular tank 204 having a free surface switch S–204, in a manner similar to that of the vertical moments. The resistor R–281 provides a signal representative of a slack condition while the resistor R–282 provides a signal representative of a 97% filled condition of the tank 204. The free surface switch S–204 is placed with its contact arm either in the center corresponding to a 0 or 100% condition thereby providing no signal or it is connected to the resistor R–281 or R–282 depending upon the condition of the tank 204. The free surface resistors R–281–8, 381–4, 481–6, 581–6, 681–94, 781–6, 881–92, 981–4, some of which are not shown in the drawing due to space limitations, are connected to the negative power supply 23 and to respective contacts. The free surface resistors that are connected by their respective switches to be effective in the circuit are disposed in parallel with respect to each other. A fixed resistor 45 is added because the fresh water tanks are always considered slack (i.e., at some time in any given voyage they will be slack), and so a constant free surface moment due to the fresh water tanks is added. As a consequence of this, no free surface switches are used for the fresh water tanks.

When all the free surface switches have been properly positioned for a given problem, the output current from this circuit is proportional to the free surface moments in the ship. This current is now used to generate a voltage which is multiplied by $(1)/\Delta$ to obtain $(FS)_e$. In order to generate a voltage, a resistor 46 is inserted in the output, and the resulting current is passed through the resistive winding of a third ganged potentiometer P–15″ that has its wiper arm connected to the displacement $\Delta$ knob 15 thereby providing a current representative of $(FS)_e$. The resistive winding of the potentiometer P–15″ is connected to one side of the meter $M_3$ in order that the $-(FS)_e$ signal is algebraically summed with the KM and $-KG$ signals to compensate for the free surface effects to thereby provide an indication of the available transverse metacentric height $GM_a$ on the meter $M_3$.

In operation, the voltages for operating the apparatus of the present invention are obtained from the positive and negative voltage regulated power supplies 22 and 23 respectively. A power supply voltage balancing system includes a potentiometer 50 in the negative power supply 23 for voltage adjustment and a switch S–3 for meter indication. When the apparatus is placed in operation, the switch S–3 connects the power supplies 22 and 23 to the meter $M_1$. When the power switch 51 is turned on, the potentiometer 50 is adjusted until the meter $M_1$ reads zero to insure that the output voltages of the two supplies 22 and 23 are equal in magnitude. Thereafter the switch S–3 is placed in the condition shown and remains there during subsequent operation.

The operator then inserts the load weights according to a trial loading chart for each hold, tank and deck area by rotating the respective load knobs until the desired weight of the cargo to be stored in each particular compartment is indicated on its dial. The function switch S is placed in its first or H, $t$ position and the salinity switch S–4 is placed in either its fresh or salt water position.

As explained previously, the draft H and trim $t$ outputs are obtained when both the net forces and their corresponding moments go to zero. This is accomplished by adjusting the draft H knob 13 to provide the proper buoyancy signal until the force meter $M_1$ provides a zero indication. Then the trim $t$ knob 16 is adjusted to provide the proper trim signal until the moment meter $M_2$ goes to zero. As explained previously, these functions are interacting, thus the force meter $M_1$ will probably have changed so that further adjustment of the draft H knob 13 will be necessary. The knobs 13 and 16 are thus adjusted alternately until both meters $M_1$ and $M_2$ have the best possible null which usually occurs with two successive adjustments. When the meters $M_1$ and $M_2$ are both nulled, the molded mean draft H and the total trim $t$ can be read directly from the dials around the respective knobs 13 and 16.

Leaving the knobs 13 and 16 in their respective positions, the operator switches the function switch S to its second or $F_{fwd}$, M position to determine the forward shear force. The shear force and bending moment outputs are portions of the basic force and moment circuits. The shear force at the forward quarter-length is composed of the sum of the net forces in those sections forward of that bulkhead nearest the quarter-length.

The forward shear force is generated by switching out unused portions of the force circuit by the function switch S. The force F knob 14 is then adjusted until the Wheatstone bridge network is balanced as evidenced by the meter $M_1$ going to zero. The forward shear force is then read directly from the dial around the knob 14. The aft shear force is the sum of the forces aft of that bulkhead nearest the after quarter-length and is found similarly by placing the function switch S in its third or $F_{aft}$ position and again balancing the bridge network by adjusting the force knob 14 until the meter $M_1$ goes to zero.

The midships bending moment is the sum of the longitudinal moments caused by either half of the ship. The function switch is placed in its second or $F_{fwd}$, M position which switches out the aft moment circuits. The bridge balance network which includes the variable resistance P–20 is then balanced by adjusting the moment M knob 20 until the moment meter $M_2$ goes to zero. The midships bending moment is then read from the dial around the knob 20.

The total ship displacement $\Delta$ function is generated electrically from the basic force circuits when the buoyancy and trim inputs are disconnected from these circuits by moving the function switch S to its fourth or $\Delta$ position. The output from the force circuits then represents only the total downward forces in the ship. This output is displayed on meter $M_1$ and the value of the $\Delta$ output is read from the dial on the displacement $\Delta$ knob 15 after the knob 15 has been adjusted to balance the bridge network by zeroing the meter $M_1$.

In order to determine the available transverse metacentric height $GM_a$, a sequential order is followed in determining the values of the other related outputs:

(a) Draft H and trim $t$
(b) Displacement $\Delta$
(c) Summation of vertical moments $\epsilon$ The shear force and bending moment outputs have no effect on the $GM_a$.

The steps for obtaining the draft H, trim $t$ and displacement $\Delta$ have been explained. The summation of vertical moments $\epsilon$ is obtained by placing the function switch in its fifth or $\epsilon$ position being careful to maintain the draft H, trim $t$ and displacement $\Delta$ knobs 13, 16 and 15, respectively, in their null positions. The summation of vertical moments $\epsilon$ is produced by an entirely different set of circuits. Each input potentiometer P supplies a voltage not only to a load weight resistor R but also to a vertical moment resistor V whose value is proportional to the vertical moment arm from the keel to a point in the hold. This vertical moment arm resistor V then supplies a current proportional to the vertical moment generated by placing the load in the ship. The currents from all such vertical moment resistors V are summed, together with a fixed current representing the lightship vertical moment from the resistor 42, to yield a current proportional to the total vertical moments in the ship. The summation $\epsilon$ knob 21 is then adjusted until the bridge balance network which includes the variable resistance P–21 is balanced as indicated by the meter $M_2$ reading zero. No dial is engraved on the face plate 12 around the summation $\epsilon$ knob 21 as this function is simply another step towards determining $GM_a$.

The free surface switches located on the status board 10 adjacent to their respective input knobs, are actuated by the operation to one of three positions, depending on the condition of the particular tank in question. The three positions are as follows:

Center: (0 or 100%).—The tank is either completely empty or is pressed up (completely full).
Left: (Slack).—The tank contains from 1% to 96% of its capacity.
Right: (97%).—The tank is nearly full, but no effort has been made to release all the trapped air in the tank (usual loaded condition).

When all the free surface switches have been properly actuated, currents are generated by the resistors connected to the free surface switches which correspond to the free surface moments which will be caused by liquids moving in the ship as it rolls. This moment, when divided by $\Delta$, yields a small vertical distance which is subtracted from the actual GM of the ship.

By means of the above adjustments, in effect a signal representative of KM is provided from the resistor $R_6$ while a signal representative of $-KG$ is provided by the potentiometer P–15' and a signal representative of $-(FS)_e$ is provided by the potentiometer P–15''. The sum of $KM-KG-(FS)_e$ is connected to the input of the meter $M_3$ to provide an indication of the available restoring moment of the ship in roll, i.e., the available transverse metacentric height $GM_a$.

With the $GM_a$ indicated by the meter $M_3$, a chart for the Mariner C4–S–1$a$ ship entitled "Required GM Curve" may be consulted to compare the indicated $GM_a$ value with the required GM value versus mean draft that must be maintained in order to sustain damage in any one compartment without reaching a condition of negative stability after damage. If the indicated $GM_a$ value is not satisfactory, rearrangement of the cargo is necessary.

Alternatively, the trim $t$ of the ship may be determined by a moment summation balance as defined by the following formula in lieu of the aforementioned Equation 2:

$$\sum_{n=1}^{5}[(G_L+G_o-B)A_L'']_n = \sum_{n=6}^{10}[(G_L+G_o-B)A_L'']_n$$

i.e., the summation of the moments of the forebody is equal to the summation of the moments of the afterbody where $A_L''$=average longitudinal moment arm from the section $n$ to the mean longitudinal center of flotation (L.C.F.).

Figure 5B:
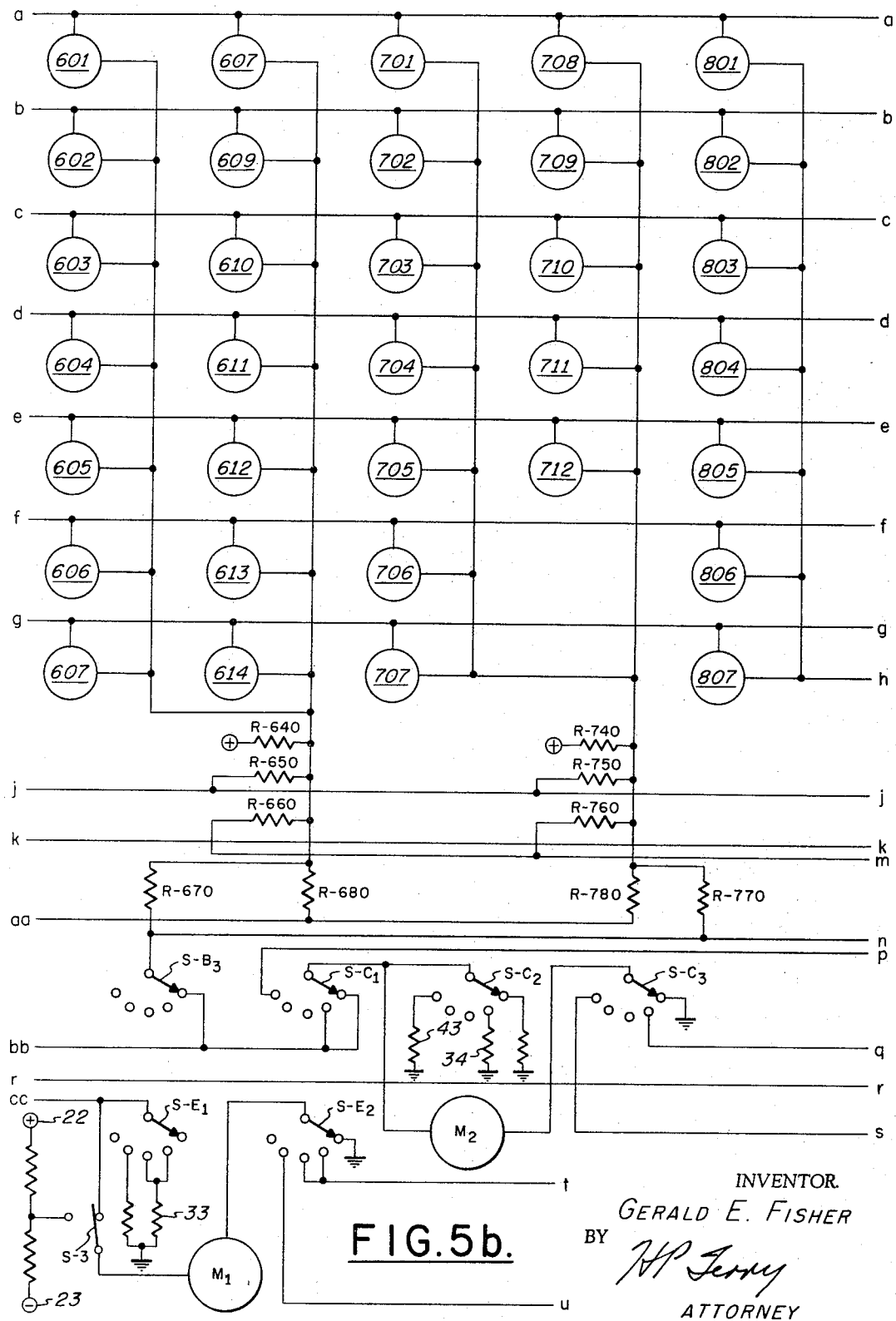
Figure 5C:
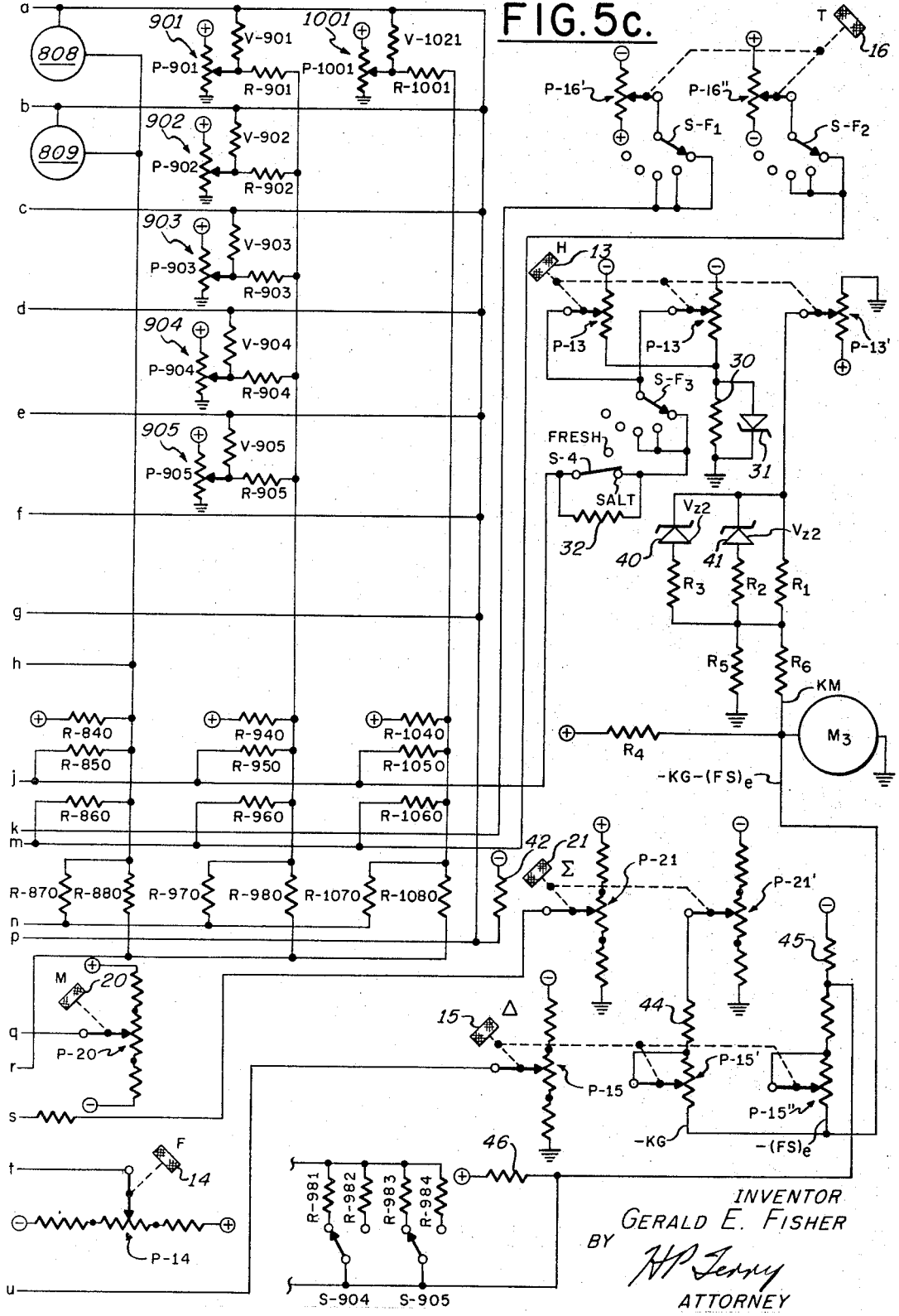

The circuit for this embodiment may be shown in FIG. 8 and is the same as that shown in FIGS. 5$a$, $b$ and $c$ except that the function switch portion S–$B_3$ is omitted, the resistor and ground connection to the first contact of the function switch S–$C_2$ is omitted, and the ground connection to the first contact of the function switch S–$C_3$ is omitted. Further, the longitudinal moment resistors R–670, 770, 870, 970 and 1070 are connected to the first contact of the function switch S–$C_3$. By this arrangement, with the function switch S in its first or H, $t$ position, the longitudinal moment resistors R–170, 270, 370, 470 and 570 are connected to one side of the meter $M_2$ while the resistors R–670, 770, 870, 970 and 1070 are connected to the other side of the meter $M_2$.

In operation, the trim $t$ output is obtained in a manner similar to that described above by adjusting the trim $t$ knob 16 to provide the proper trim signal as evidenced by the moment meter $M_2$ reading zero when the summation of the moments of the forebody is equal to the summation of the moments of the afterbody.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:
1. In apparatus for determining the proper loading of a craft, the combination of
  (a) means for generating first signals representative of a particular loading of said vessel,
  (b) means for generating second signals representative of the buoyancy of said vessel,
  (c) means responsive to said first and second signals for providing a signal representative of the draft of said craft,
  (d) means responsive to said draft signal for generating a third signal representative of the distance of the metacenter above the keel,
  (e) means for generating fourth signals representative of the vertical moments,
  (f) means responsive to said first and fourth signals for providing a fifth signal representative of the distance above the keel of the ship's center of gravity, and
  (g) means responsive to said third and fifth signals for providing a signal representative of the stability of said craft in roll.

2. In apparatus of the character described in claim 1 further including means responsive to the condition of at least a portion of said loading for compensating said stability signal in accordance with the relative movability of said portion of said load with respect to said craft.

3. In apparatus of the character described in claim 1 further including means responsive to the loading of said craft for generating a signal representative of the midship's bending moment occasioned by said load.

4. In apparatus for determining the proper loading of a craft, the combination of
  (a) first adjustable means for generating a signal representative of the total displacement of said craft,
  (b) second adjustable means for generating a signal representative of the summation of the vertical moments of said craft,
  (c) third means responsive to said first and second means for providing a signal representative of the vertical distance of the center of gravity above the keel of said craft,
  (d) fourth adjustable means for providing a signal representative of the mean draft of said loaded craft,
  (e) fifth means responsive to said fourth means for providing the signal representative of the vertical distance of the metacenter above the keel of said craft, and
  (f) means responsive to said third and fifth means for providing a signal in accordance with the difference between the signals from said third and fifth means representative of the transverse metacentric height.

5. In apparatus of the character described in claim 4 further including means for generating a signal representative of the free surface effects of the load in said craft for correcting the transverse metacentric height signal in accordance with the last-named generated signal.

6. In apparatus for computing the proper loading of a craft, the combination of
  (a) first adjustable means for generating a signal representative of the load to be placed on said craft,
  (b) second means for providing a signal representative of the lightship weight of said craft,
  (c) third adjustable means for providing a signal representative of the buoyant force to be experienced by said craft,
  (d) fourth adjustable means for compensating said buoyant force signal in accordance with the expected trim condition of said craft,
  (e) fifth adjustable means responsive to said first and second means for providing a signal representative of the displacement of said craft,
  (f) sixth adjustable means for generating a signal representative of the sum of all the vertical moments of said craft with respect to the keel thereof,
  (g) seventh means responsive to said fifth and sixth means for providing a signal representative of the vertical height of the center of gravity of said craft above its keel,
  (h) eighth means responsive to said third means for providing a signal representative of the vertical distance of the metacenter above the keel of said craft, and
  (i) ninth means responsive to said seventh and eighth means for providing a signal representative of the difference between the vertical distance of the metacenter above the keel and the vertical distance of the center of gravity above the keel which represents the transverse metacentric height.

7. In apparatus of the character described in claim 6 further including means for generating a signal representative of the free surface effects of the load in said craft for correcting the transverse metacentric height signal in accordance with the last-named generated signal.

8. In apparatus of the character described in claim 6 further including tenth means for generating a signal representative of the sum of the free surface moments of said craft and means responsive to said fifth and tenth means for providing a signal representative of the sum of the free surface moments divided by the displacement for correcting the transverse metacentric height in accordance therewith to provide a signal representative of the available transverse metacentric height.

9. In apparatus for determining the proper loading of a craft, the combination of
  (a) first adjustable resistive means for generating a signal representative of the load to be placed on said craft,
  (b) second resistive means for providing a signal representative of the lightship weight of said craft,
  (c) third adjustable resistive means for providing a signal representative of the buoyant force to be experienced by said craft,
  (d) fourth adjustable resistive means for compensating said buoyant force signal in accordance with the expected trim condition of said craft,
  (e) fifth adjustable resistive bridge network means responsive to said first and second means for providing a signal representative of the displacement of said craft,
  (f) sixth adjustable resistive bridge network means responsive to said first means for generating a signal representative of the sum of all the vertical moments of said craft with respect to the keel thereof,
  (g) seventh variable resistive means responsive to said fifth and sixth means for providing a signal representative of the vertical distance of the center of gravity of said craft above its keel,
  (h) eighth non-linear circuit means responsive to said third means for providing a signal representative of the vertical distance of the metacenter above the keel of said craft, and
  (i) ninth means responsive to said seventh and eighth means for providing a signal representative of the difference between the vertical distance of the metacenter above the keel and the vertical distance of the center of gravity above the keel which represents the transverse metacentric height.

10. In apparatus of the character described in claim 9 further including means for correcting said transverse metacentric height signal in accordance with the free surface effects of said load.

11. In apparatus of the character described in claim 9 further including tenth means for generating a signal representative of the sum of the free surface moments of said craft and means responsive to said fifth and tenth means for providing a signal representative of the sum of the free surface moments divided by the displacement for correcting the transverse metacentric height in accordance therewith to provide a signal representative of the available transverse metacentric height.

12. In apparatus for computing the proper loading of a craft, the combination of
  (a) a plurality of first adjustable resistive means for generating signals representative of the loads to be placed in predetermined locations on portions of said craft,
  (b) a plurality of second resistive means for providing signals representative of the lightship weight of said portions of said craft,
  (c) third adjustable means including a plurality of resistive means for providing signals representative of the buoyant forces to be experienced by said portions of said craft,
  (d) fourth adjustable means including a plurality of resistive means for compensating said buoyant force signals in accordance with the trim condition of said craft,
  (e) fifth adjustable resistive bridge network means responsive to said first and second means for providing a signal representative of the total displacement of said craft,
  (f) each of said first means further including resistive means for generating signals representative of the load vertical moments of said portions of said craft with respect to the keel thereof,
  (g) sixth adjustable resistive bridge network means responsive to said first means for generating a signal representative of the sum of all the vertical moments of said craft with respect to the keel thereof,
  (h) seventh variable resistive means responsive to said fifth and sixth means for providing a signal representative of the vertical distance of the center of gravity of said craft above its keel,
  (i) eighth means responsive to said third means for providing a signal representative of the vertical distance of the metacenter above the keel of said craft, and
  (j) ninth means responsive to said seventh and eighth means for providing a signal representative of the difference between the vertical distance of the metacenter above the keel and the vertical distance of the center of gravity above the keel which represents the transverse metacentric height.

13. In apparatus of the character described in claim 12 further including means for correcting said transverse metacentric height signal in accordance with the free surface effects of said load.

14. In apparatus of the character described in claim 12 further including tenth means for generating a signal representative of the sum of the free surface moments of said craft and means responsive to said fifth and tenth means for providing a signal representative of the sum of the free surface moments divided by the displacement for correcting the transverse metacentric height in accordance therewith to provide a signal representative of the available transverse metacentric height.

References Cited

UNITED STATES PATENTS

| | | | |
|---|---|---|---|
| 2,443,098 | 6/1948 | Dean | 73—65 X |
| 2,725,193 | 11/1955 | Kolisch | 235—179 X |
| 2,735,291 | 2/1956 | Quinn | 73—65 |
| 2,856,127 | 10/1958 | Kolisch et al. | 235—150.2 |
| 2,865,566 | 12/1958 | Swenson | 235—179 X |
| 2,901,171 | 8/1959 | Kolisch | 73—65 X |
| 2,942,781 | 6/1960 | Abatemarco | 235—179 |
| 2,987,254 | 6/1961 | Kolisch | 73—65 X |
| 3,128,375 | 4/1964 | Grimnes | 235—179 X |
| 3,163,750 | 12/1964 | Lindsey et al. | 235—193 X |
| 3,280,310 | 10/1966 | Montooth | 235—193 |

FOREIGN PATENTS 905,538  9/1962  Great Britain.

MALCOLM A. MORRISON, *Primary Examiner.*

I. KESCHNER, J. RUGGIERO, *Assistant Examiners.*